July 20, 1965  J. M. GWIN  3,195,258
MOUNTING FRAME FOR SLIDES AND THE LIKE
Filed July 3, 1961
FIG. 1
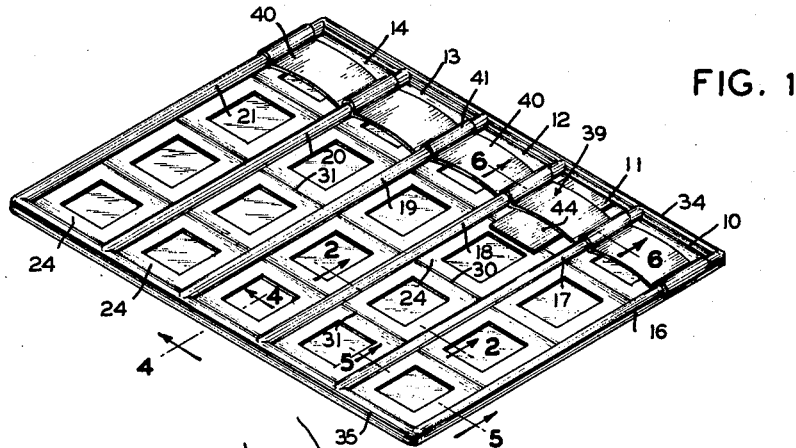
FIG. 2
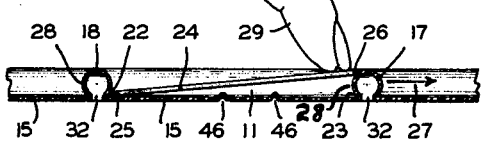
FIG. 4
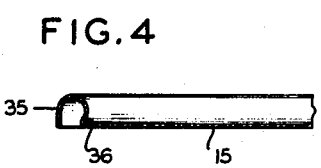
FIG. 3
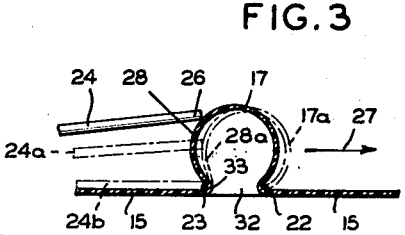
FIG. 5
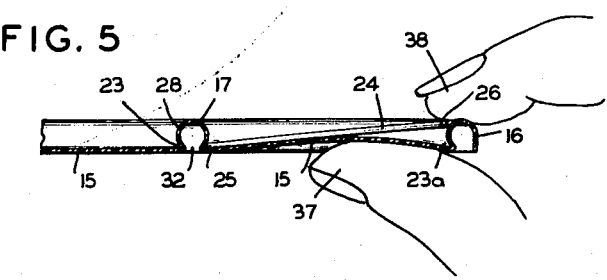
FIG. 7
FIG. 6
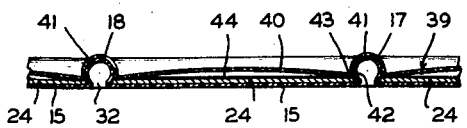
INVENTOR
JAMES M. GWIN
BY *Joshof & Osheoff*
ATTORNEYS United States Patent Office 3,195,258
Patented July 20, 1965

3,195,258
MOUNTING FRAME FOR SLIDES AND THE LIKE
James M. Gwin, 72 Frederick Lane, Glendale, Mo.
Filed July 3, 1961, Ser. No. 121,439
8 Claims. (Cl. 40—158)

The present invention relates to a mounting frame for holding, in side-by-side relationship, a plurality of slides and the like. More particularly, the present invention relates to a mounting frame which is provided with a plurality of slide holding channels so constructed that the slides can be easily positioned in the channels or removed therefrom.

According to the prior art, slides, particularly photographic slides, have been stored in two types of holders. The first type of holder comprises a box or container wherein the slides are superimposed one on the other. This type of storage device has several shortcomings. First of all, the boxes or containers cannot be easily stored in an ordinary file cabinet. Secondly, the slides in the container cannot be readily inspected, it being necessary to remove each individual slide from the container to determine the subject matter thereof.

The second type of holder for slides holds the slides in side-by-side manner, usually by positioning the slides in some sort of pocket. This type of holder can easily be stored in a file cabinet and permits the slides to be viewed or examined without removing them from the holder. However, this type of holder, according to the prior art, has been made in a relatively complicated manner, and is relatively expensive to manufacture. Furthermore, removal or insertion of the slides in such holders has required extensive manipulation of the slides or holders.

The above shortcomings of the prior art have been overcome by the present invention, which provides a relatively inexpensive, easily fabricated mounting frame, which can be used to assemble the slides in a side-by-side manner, thereby permitting storage in an ordinary file cabinet, as well as permitting viewing or examination of all of the slides in a mounting frame at one time. Furthermore, the mounting frame of the present invention permits the removal and insertion of slides in a very simple manner.

According to one aspect of the invention, there is provided a mounting frame for holding, in side-by-side relationship, a plurality of slides, the frame comprising a plurality of laterally spaced apart longitudinally extending channels, said channels being defined by a supporting web having on one surface thereof a plurality of laterally spaced apart longitudinally extending ribs, a pair of adjacent ribs defining between them a channel, each of said ribs being undercut on a side facing a channel to provide a flange for receiving the edges of the slides, at least one rib of each channel being laterally yieldable, whereby a slide can be positioned in and removed from said channel by laterally displacing said yieldable rib. Each yieldable rib is provided with a reversely curved surface on each side thereof facing a channel to provide camming surfaces so that the rib will yield laterally upon the application of a vertically upward or downward force on said camming surface.

According to a preferred aspect of the invention, each yieldable rib is hollow and is generally C-shaped in cross section, with the opening of the C facing and communicating with the lower surface of the supporting rib.

According to the preferred aspect of the invention, the ribs and supporting web are made of sheet material with the ribs being integral with the supporting web, said ribs being formed or folded out of the plane of the supporting web.

According to another aspect of the invention, there is provided a cover for the frame which can be easily snapped onto or removed from the frame, said cover being similar in structure to the frame itself.

An object of the present invention is to provide a mounting frame for holding, in side-by-side relationship, a plurality of slides whereby the slides can be snapped in or out of the frame.

Another object of the invention is to provide a mounting frame made from a single sheet of material, such as sheet plastic, preferably by vacuum forming.

A further object of the invention is to provide a mounting frame for holding a plurality of slides whereby the frame, together with the slides therein, can be stored in an ordinary file cabinet, and wherein the slides on the frame can be all viewed at one time, either by reflected or transmitted light, the transmitted light passing through the mounting fame.

A further object of the invention is to provide a mounting frame for holding a plurality of slides in side-by-side relationship wherein the frame can hold a maximum number of slides in a minimum area of frame.

These and other aspects and objects of the present invention will be readily apparent from the following description, taken in connection with the accompanying drawings, wherein.

FIG. 1 shows a perspective view of the mounting frame having positioned therein a plurality of slides.

FIG. 2 is a fragmentary cross section, taken on the line 2—2 of FIG. 1, showing a slide being inserted in one of the channels of the frame.

FIG. 3 is an enlarged fragmentary cross section, corresponding to FIG. 2, showing the movement of a rib defining a channel during the insertion of a slide in the channel.

FIG. 4 is a fragmentary cross section of the mounting frame, taken along the line 4—4 of FIG. 1.

FIG. 5 is a fragmentary cross section, taken along the line 5—5 of FIG. 1, showing one method of removing a slide from the mounting frame.

FIG. 6 is a cross section of the frame with the cover thereon, taken along the line 6—6 of FIG. 1.

FIG. 7 is a fragmentary cross section of a rib of the frame showing a modified rib shape.

The mounting frame of the present invention comprises a plurality of laterally spaced apart longitudinally extending channels, 10, 11, 12, 13 and 14. In FIG. 1, a mounting frame is shown having five such channels, but it is apparent that any desirable number of channels may be provided. These channels are defined by a supporting web 15 having on the upper surface thereof a plurality of laterally spaced apart longitudinally extending ribs 16, 17, 18, 19, 20 and 21, a pair of adjacent ribs defining between them one of said channels. For example, ribs 16 and 17 define channel 10, while ribs 17 and 18 define between them channel 11. It will be appreciated that in the illustrated embodiment the intermediate ribs 17, 18, 19 and 20 are common to two channels.

Each of the ribs is undercut on a side facing a channel, as indicated for example in FIG. 2, by the numerals 22 and 23. The undercutting of the ribs provides a flange for receiving the edges of slides 24. It is apparent that when the opposite edges of a slide are positioned within the flanges, the slide will be held within the channel, so that the mounting frame can be moved to any position, vertical or horizontal, with the slide facing upwardly or downwardly, the slide being prevented from falling out of the channel by virtue of the flanges.

In order to provide for the insertion of the edges of the slides into the flanges, at least one rib, and preferably both ribs, of each channel are laterally yieldable.

By "yieldable" is meant that the ribs are sufficiently resilient that they can be displaced laterally upon the application of a force, and will be returned to their former position by removing the force.

The insertion of a slide in a channel is illustrated in FIGS. 2 and 3, which show a slide being inserted in channel 11. The edge 25 of slide 24 is positioned in flange 22 of rib 18. The ribs are so spaced apart that when a slide 24 is positioned in this manner, the other edge 26 of the slide rests on an upper portion of rib 17. It is apparent that if rib 17 is then laterally displaced to the right of FIG. 2, as indicated by the arrow 27, the edge 26 would drop into flange 23, so that when the rib 17 is restored to its original position because of its resilient nature, the slide will be positioned in the channel.

Although the yieldable rib 17 can be laterally displaced by the application of pressure from the fingers, means are preferably provided for automatically accomplishing the lateral movement by merely pressing the slide into position. This means is constituted by providing the yieldable rib with a reversely curved surface 28 on the side thereof facing the channel. This reversely curved surface constitutes a camming surface. It is now merely necessary to position a slide 24 in channel 11, as shown in FIG. 2, and also by the solid lines in FIG. 3. By pressing upon the slide by means of finger 29, near edge 26, the edge 26 will act on camming surface 28 to move the rib 17 laterally to the position shown in dotted lines 17a in FIG. 3. At this point, the slide shown in dotted lines 24a presses against the camming surface shown in dotted lines 28a. Further pressure upon the slide causes the slide to come to rest in the position shown by dotted lines 24b. At this time, because of its resilient nature, the rib 17 snaps back to its original position shown by the solid lines and the slide is held in flange 23.

To remove a slide from a channel, it is merely necessary to grasp the opposed edges of the slide which are not within the flanges. For example, referring to FIG. 1, the slide 24 is grasped at the edges 30 and 31 to move the slide away from the supporting web. This upward movement of the slide again brings the edge 26 of the slide against the camming surface 28 to displace the rib 17 in the direction of arrow 27, and thereby permits removal of the slide from the channel. It is apparent from the above description that the slides are easily snapped in and out of the channels, only one hand being necessary to snap the slides in or out of the channels.

According to the preferred construction of the present invention, the mounting frame is made from sheet plastic material and the ribs are integral with the supporting web. The frame of this construction is preferably made by conventional techniques of vacuum forming to form the ribs out of the sheet material. During the vacuum forming of the frame, the ribs are displaced or folded out of the plane of the sheet material. Instead of using vacuum forming, there can also be used other plastic forming techniques, such, as for example, injection molding. Whether the ribs are actually folded out of the plane of the sheet material or whether the ribs are formed simultaneously with the web by injection molding, the word "folding" is used herein to refer to the appearance or structure of the final article, and is not to be construed as limited to an actual folding operation.

In the preferred embodiment, each of the ribs is hollow and has a generally C-shaped cross section with the opening of the C, as shown at 32, communicating with and facing the lower surface of the supporting web 15. By constructing the rib from sheet material, and especially by providing the opening 32 at the bottom of the rib, the rib is rendered laterally yieldable.

In the illustrated construction, as shown particularly in FIG. 3, the rib 17 is rendered laterally yieldable by virtue of the attachment of the rib to the web at 33, the plastic sheet bending at 33 to permit displacement of the rib. Stated differently, the rib 17 more or less rolls from its normal position to the offset position.

It will be appreciated that ribs 17, 18, 19 and 20, the ribs common to two channels, are yieldable laterally toward and away from each channel. In other words, the ribs are yieldable in both directions to permit a slide to be inserted in either channel.

The rigidity of the ribs is determined by several factors, namely, the thickness of the sheet material, the nature of the sheet material, the diameter of the rib, and the lateral dimension of the opening or space 32. The lateral spacing of the ribs is determined by the height, that is, the distance between edges 25 and 26, of the slides 24. The curvature of the ribs and particularly the vertical height of the flanges 22 and 23 are determined by the thickness of the slides. The lateral spacing of the ribs and the height of the flanges are so selected that the slides can easily be inserted into and removed from the channels, while at the same time, the slides are securely held within the channels to prevent their falling out when the assembly is inverted. Furthermore, the spacing is so selected that the slides are held within the channels by sufficient friction to prevent the slides from freely sliding longitudinally of the channels by their own weight, but to permit the slides to be freely moved longitudinally the length of the channels by the user.

To prevent the slides from falling out of the channels by sliding therealong when the assembly is dropped or shaken and also to provide a reinforcement to the mounting frame, the mounting frame is provided with transverse or header beads 34 and 35. These beads are also preferably formed integral with the supporting web 15, and are formed during the formation of the ribs. The beads interconnect the ribs at their ends and also provide a closure for the ends of the channels. Preferably the beads 34 and 35 have essentially the same cross sectional shape as the ribs although the shape of the beads is not critical since the beads merely serve as a reinforcement for the frame and as closures for the ends of the channels. It is, therefore, apparent that the beads 34 and 35 do not have to be laterally yieldable. Furthermore, the beads may be hollow or solid (not shown). Nevertheless, in order to save space, it may be desirable to have the beads 34 and 35 undercut as at 36. Space will be saved because a portion of the bead would thereby overhang the edge of the slide.

When the bead is undercut and a slide is positioned at the end of a channel, three edges of the slide will be held under the respective flanges of two ribs and a bead. In this position it would be difficult to remove a slide from the channel by vertical movement. Even when the bead is not undercut, the bead frequently renders the rib less yieldable near the points of connection between the ribs and the bead. This also renders it difficult to remove a slide directly from the end of a channel. Therefore, when inserting a slide in a channel, the slide is positioned more or less in the middle of the channel and snapped into position at that point. Then the slide may be shifted, while in the channel, toward the end of the channel, thereby permitting a further slide to be inserted in the channel near the middle thereof. The reverse procedure is followed when removing a slide or slides.

The reinforcing beads prevent the supporting web from significantly bending or flexing in a direction transverse to the plane of the web. Nevertheless, the supporting web may slightly flex between the ribs, and this feature can be utilized, if desired, to remove a slide from the channels, as shown in FIG. 5. As shown in FIG. 5, a slide can be removed from the channel by placing a finger 37 on the under side of the channel and pressing upwardly, while at the same time finger 38 is positioned on the rib 16. As the supporting web 15 flexes upwardly, the slide 24 is snapped out of flange 23a.

In the illustrated embodiment, all of the ribs, including the end ribs 16 and 21 yield laterally. It is apparent that the end ribs 16 and 21 need not be yieldable, since it is only necessary for one rib of each channel to be yieldable. In addition, although in the preferred construction, there are provided a plurality of channels, the present invention also encompasses within its scope a mounting frame comprising only a single channel (not shown), said channel being defined by spaced apart laterally yieldable ribs with the ends of the channel being closed by transverse beads interconnecting the ribs at their ends. It is also apparent that it may be desirable in certain circumstances, where the channels are very long to provide intermediate reinforcing beads (not shown) for further reinforcement.

The expression "slides" as used herein, not only includes conventional photographic slides made of substantially rigid material, such as cardboard or glass, but also includes film strips and other flexible and rigid indicia bearing slides, plaques, mounts, films, etc. For example, a particular application of the present invention is to provide a sign wherein each of the plaques or slides has thereon letters or other indicia, so that the subject matter of the sign can be easily changed at will. Such a device can be used, for example, for a restaurant menu.

In the preferred embodiment, the slides are rigid and are held in position by the flanges. Frequently, it is desirable to store, either together with the rigid slide or without them, flexible slides or material such as flexible film strips or even notes written on paper. Such material, because of its flexibility, would not necessarily be held by the flanges. Additionally, such material may be too narrow to be received under the flanges. In order to permit the use of the mounting frame with such flexible and/or undersized material, the frame may be provided with one or more removable snap-on cover members or strips 39. Such cover strips can be used even with rigid slides of the proper size where necessary or desirable.

The cover members 39 comprise a supporting web 40 having integral therewith a plurality of laterally spaced apart longitudinally extending hollow ribs 41, each of the ribs being open at the bottom of the web as shown at 42. In this manner, the interior of each rib defines a longitudinal chamber for receiving a rib of the mounting frame. These hollow ribs 41 are undercut at 43 so as to provide a restricted opening. In other words, the opening 42 is narrower than the diameter of the chamber above the opening. In this manner, when the cover is positioned over the mounting frame, the ribs of the mounting frame will snap into the hollow ribs or chambers of the cover. Hollow ribs 41 are, therefore, preferably C-shaped as are the ribs of the mounting frame, the chambers of the cover being generally complementary in shape to the ribs of the mounting frame.

The cover members 39 can be made of the same materials and in the same manner as the mounting frame itself. According to the preferred construction, the cover is made by vacuum forming sheet plastic. The cover members, when in position on the frame, not only assist in holding rigid slides in place but will also hold in the channels, material such as film strip 44. In the illustrated construction, the portion of the web 40 between adjacent ribs 41 of the cover is slightly longer than the distance between adjacent ribs of the mounting frame whereby the web 40 bows slightly upwardly. It is apparent that web 40, if so desired, can be made slightly smaller so that there is no bowing (not shown).

It is apparent that both the cover and mounting frame comprise a supporting web having on the upper surface thereof and integral therewith a plurality of laterally spaced apart longitudinally extending ribs, each rib being hollow and generally C-shaped in cross section, with the opening of the "C" facing and communicating with the lower surface of the web.

Optionally, the web of the covers can have a roughened or matte surface thereon, either on the upper side or on the lower side, so that the web can be written on.

In defining the ribs as being generally C-shaped, it is intended to include not only the shape illustrated but also comparable shapes. In other words, by C-shaped is meant a generally annular curve having an opening near the bottom with the portion of the curve intermediate the top and bottom being bulged outwardly. By way of example, in FIG. 7 there is shown a modified form of a rib of the mounting frame, said rib having a flattened surface 45 at the top thereof in order to reduce the depth of the mounting frame. The rib shown in FIG. 7 is also considered C-shaped.

In referring to the ribs as being "undercut," this expression obviously does not means that a portion of the rib is actually cut away but merely refers to the appearance of the rib in the final article wherein a portion of the rib projects laterally or outwardly, said outward projection being spaced above the bottom of the rib.

In the above description and in the claims appended hereto, the words "longitudinally" and "laterally" are used to indicate relative direction only and do not necessarily refer to the long or short dimension of the mounting frame.

The mounting frame of the present invention, because of its construction, can store a maximum number of slides in a minimum area. Referring to FIG. 1, it will be noted that twenty slides can be stored side by side in an area only slightly more than the area of the slides themselves, only a small additional space being necessary to provide for the ribs and beads. In addition, whether or not one or more of the covers 39 be used, the frame holds the slides very securely. Whether the frame be jarred in a direction transverse to the plane of the frame or in any direction parallel to the plane of the frame, the slides are firmly retained within the channels.

Since the slides can be slid along the channels, the frame of the present invention permits easy re-arranging of the slides. This feature, coupled with the ease of snapping in and snapping out individual slides, provides the user of the mounting frame with a means for easily arranging and storing his slides.

The mounting frame, and the covers, as stated previously are preferably made of plastic and the web of the frame can either be opaque or translucent, the word "translucent" being inclusive of the word "transparent."

In the preferred construction, the supporting webs are translucent so that the slide mounted in the frame can be viewed by transmitted light passing through the supporting web. Desirably, the supporting webs diffuse the light so that the frame can be positioned in front of any type of light source although, obviously, a special light box can be constructed for use with the frame.

When the supporting webs are translucent, the mounting frame can be used to hold a plurality of photographic transparencies including X-rays, such as dental X-rays, whereby a plurality of slides can be viewed at one time by holding the frame with the slides therein before a light source. If the supporting web is opaque, the slides can be viewed by means of reflected light.

The mounting frame and the covers can be made of any desirable plastic. By way of example, there may be used plastics such as polystyrene, cellulose nitrate, cellulose acetate, or a polyester such as the polyterephthalate sold under the trademark "Mylar." A preferred plastic is cellulose acetobutyrate. It has been found, when vacuum forming the frame and the cover from cellulose acetobutyrate, that excellent results are obtained when the sheet plastic is of the order of .020 inch thick. This provides a frame which is sufficiently rigid to be easily handled and supplies the ribs with sufficient resiliency or elasticity to render the slides capable of being easily snapped in and out.

Referring again to FIG. 3, when a slide is snapped in or out of the frame, the rib 17 bends at 33 and the cellulose acetobutyrate of indicated thickness is sufficiently resilient to provide for a good snapping action. It is also to be noted that the lateral yielding of the rib 17 is effected not only by the bending at 33 but also by a slight bending or lateral yielding of the curved surface 28.

The size of the opening 32 also serves to control the resiliency of the rib 17. Excellent results are obtained when the opening 32 is of the order of 1/8" with the diameter of the ribs being about of the order of 1/4".

When using the mounting frame with conventional 2 x 2 photographic transparencies, it has been found that excellent results are obtained when the height of the flange defined by the undercut of the rib is slightly less than the thickness of the slide. This permits the slide to be easily slid along the channels and yet holds the slide securely in the frame.

In the event it is desirable to reduce the ease of sliding of the slides along the channels, there may be provided upstanding protuberances 46 in the upper surface of the supporting web between the ribs thereon.

"Sheet material" is used herein, unless otherwise indicated by the context, refers to the final article and not necessarily to the fact that the article may have been shaped from a preformed sheet.

I claim:

1. A mounting frame for holding, in side-by-side relationship, a plurality of slides, said frame comprising a plurality of laterally spaced apart longitudinally extending channels, said channels being defined by a supporting web having on the upper surface thereof, a plurality of laterally spaced apart longitudinally extending ribs, a pair of adjacent ribs defining between them a channel, each of said ribs being undercut on a side facing a channel to provide a flange for receiving the edges of said slides, at least one rib of each channel being laterally yieldable whereby a slide can be positioned in and removed from said channel by laterally displacing said yieldable rib, each yieldable rib being hollow and generally C-shaped in cross section, with the opening of the C facing and communicating with the lower surface of said supporting web so as to provide each yieldable rib with a reversely curved surface on each side thereof facing a channel to form a camming surface, so that the rib will yield laterally upon the application of a vertically upward or downward force on said camming surface; and a removable cover for said frame, said cover comprising a supporting web having thereon a plurality of laterally spaced apart longitudinally extending hollow ribs, said ribs having an opening at the bottom thereof in communication with the lower surface of said supporting web whereby the ribs of the mounting frame can be snapped in and out of the ribs of the cover.

2. A mounting frame according to claim 1, wherein the ribs are integral with the supporting web, said ribs being folded out of the plane of the supporting web.

3. A mounting frame according to claim 2, wherein each of the channels is closed at its ends by a transverse bead.

4. A mounting frame according to claim 3, wherein said transverse beads interconnect the ends of the ribs.

5. A mounting frame according to claim 4, wherein the beads are integral with said supporting web and are folded out of the plane of the supporting web.

6. A mounting frame according to claim 5, wherein the mounting frame is made of plastic material.

7. A mounting frame according to claim 6, wherein at least the supporting webs are translucent.

8. A mounting frame according to claim 1 wherein the interior of the ribs of the cover are substantially complementary in shape to the ribs of the mounting frame.

References Cited by the Examiner

UNITED STATES PATENTS

| 2,614,354 | 10/52 | Winslow | 40—158 |
| 2,847,777 | 8/58 | Page | 40—142 X |
| 2,908,094 | 10/59 | Mast | 40—106.1 |
| 2,968,882 | 1/61 | Ozeki | 40—106.1 |

FOREIGN PATENTS

| 160,781 | 8/21 | Great Britain. |
| 506,792 | 6/20 | France. |
| 95,924 | 8/22 | Switzerland. |

EUGENE R. CAPOZIO, *Primary Examiner.*

EDWARD V. BENHAM, JEROME SCHNALL,
*Examiners.*